US009763202B2

(12) United States Patent
Ikenaga et al.

(10) Patent No.: US 9,763,202 B2
(45) Date of Patent: Sep. 12, 2017

(54) WIRELESS COMMUNICATION APPARATUS AND WIRELESS COMMUNICATION METHOD

(71) Applicant: SONY CORPORATION, Tokyo (JP)

(72) Inventors: Yoshihiko Ikenaga, Tokyo (JP); Kazuyuki Sakoda, Chiba (JP); Nobuhiko Watanabe, Kanagawa (JP); Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/907,554

(22) PCT Filed: May 30, 2014

(86) PCT No.: PCT/JP2014/064471
§ 371 (c)(1),
(2) Date: Jan. 25, 2016

(87) PCT Pub. No.: WO2015/015891
PCT Pub. Date: Feb. 5, 2015

(65) Prior Publication Data
US 2016/0174165 A1    Jun. 16, 2016

(30) Foreign Application Priority Data

Jul. 29, 2013    (JP) ................. 2013-156362

(51) Int. Cl.
*H04B 1/04*    (2006.01)
*H04W 52/24*    (2009.01)
(Continued)

(52) U.S. Cl.
CPC ........ *H04W 52/243* (2013.01); *H04B 17/318* (2015.01); *H04W 52/242* (2013.01);
(Continued)

(58) Field of Classification Search
CPC ... H04W 74/00; H04W 74/004; H04W 74/02; H04W 74/0808; H04W 76/002;
(Continued)

(56) References Cited

U.S. PATENT DOCUMENTS

| | | | | |
|---|---|---|---|---|
| 2011/0034204 | A1* | 2/2011 | Sawai | H04W 4/02 455/522 |
| 2013/0210460 | A1* | 8/2013 | Subramanian | B61L 15/0027 455/456.3 |
| 2014/0378180 | A1* | 12/2014 | Schwent | H04W 52/241 455/522 |

FOREIGN PATENT DOCUMENTS

| | | | |
|---|---|---|---|
| JP | 2005-253047 A | 9/2005 | |
| JP | 2006-042076 A | 2/2006 | |

(Continued)

*Primary Examiner* — Tu X Nguyen
(74) *Attorney, Agent, or Firm* — Chip Law Group

(57) ABSTRACT

To suitably perform information transfer, while suppressing interference to other terminal stations, and preventing a reduction of a transmission opportunity of other terminal stations.
A terminal station estimates a distance of another terminal station (within a receivable range), from an MCS or RSSI, for example, and controls a transmission power of itself, in accordance with a value weighted with respect to distance. For example, in the case where it is estimated that a number of terminal stations with a far distance has increased, from the value weighted with respect to distance, a transmission power of itself is lowered. As a result of this, transmission by multi-hop is explicitly performed, and it is possible to suppress electric wave interference of a multi-hop destination.

19 Claims, 14 Drawing Sheets

(51) Int. Cl.
  *H04W 52/28* (2009.01)
  *H04W 52/46* (2009.01)
  *H04B 17/318* (2015.01)
  *H04W 84/18* (2009.01)
  *H04L 12/413* (2006.01)
  *H04W 52/38* (2009.01)

(52) U.S. Cl.
  CPC ......... *H04W 52/283* (2013.01); *H04W 52/46* (2013.01); *H04W 84/18* (2013.01); *H04L 12/413* (2013.01); *H04W 52/245* (2013.01); *H04W 52/383* (2013.01); *Y02B 60/50* (2013.01)

(58) Field of Classification Search
  CPC ............. H04W 76/021; H04W 76/043; H04W 76/048; H04W 80/00; H04W 80/04; H04W 84/22; H04W 88/06; H04W 88/10; H04W 88/12; H04W 88/16; H04W 72/082; H04W 40/02; H04W 84/18; H04W 4/046; H04W 52/325
  USPC ........................ 455/69, 522, 63.1, 114.2, 297
  See application file for complete search history.

(56) References Cited

FOREIGN PATENT DOCUMENTS

| | | |
|---|---|---|
| JP | 2011-254191 A | 12/2011 |
| JP | 2013-123168 A | 6/2013 |

\* cited by examiner

Beacon Interval Timing Element 700

WIRELESS COMMUNICATION APPARATUS AND WIRELESS COMMUNICATION METHOD

TECHNICAL FIELD

The technology disclosed in the present disclosure is related to a wireless communication apparatus and wireless communication method which mainly controls access to a media in accordance with an occupancy state of the media, and for example, is related to a wireless communication apparatus and wireless communication method which performs information transfer under a communication environment in which a plurality of terminal stations are present by a same channel such as a mesh network.

BACKGROUND ART

In networks using wireless technology, a configuration method is widely known in which each terminal performs information transfer by a subordinate of a control station called an "access point" or the like. Each terminal station performs wireless communication, while synchronizing via the access point. For example, a terminal station reserves a necessary band for information transfer, and uses a channel so that a collision with information transfer of other terminal stations is not produced. However, in such a configuration method of a network, it may be necessary to perform wireless communication via the access point, even at the time when performing asynchronous communication among terminals, and there will be the problem of the utilization efficiency of the channel being reduced by half.

In contrast to this, "Ad-hoc communication", in which terminal stations perform direct and asynchronous wireless communication not via an access point, has been devised as another configuration method of a wireless network. For example, in an IEEE802.11 type wireless Local Area Network (LAN) system, in addition to an infrastructure mode in which an access point intervenes, an Ad-hoc mode is prepared in which each terminal station is operated by Peer-to-Peer with autonomous distribution, without distributing an access point.

In an Ad-hoc network, there is no means for synchronizing between terminal stations, such as an access point. Accordingly, it may be necessary to avoid competition, at the time where a plurality of terminal stations use a same channel Carrier Sense Multiple Access (CSMA) is known as a representative access system which avoids competition. In CSMA, a terminal station with transmission information avoids collisions by a procedure, which confirms an occupancy state of a media before transmission, and starts transmission in the case where the media is clear.

Further, in CSMA, there is the problem of hidden terminals. Here, a hidden terminal is a terminal station in a state where mutual wireless signals do not arrive. Since a carrier of a hidden terminal is not able to be detected, a collision with a hidden terminal is not able to be avoided by only CSMA.

RTS/CTS has been devised as a method which avoids collisions with hidden terminals. A communication station of a transmission source transmits a transmission request packet Request To Send (RTS), and starts data transmission by replying to a confirmation notification packet Clear To Send (CTS) received from a communication station of a data transmission destination. Also, since a hidden terminal can receive at least one of a RTS and a CTS, a collision is avoided, by setting a transmission stop period of the station itself only for the period in which it is assumed that data transfer is performed based on RTS/CTS.

However, in an access system based on CSMA, there will be the problem of a transmittable opportunity being reduced in accordance with the terminal station number attempting to perform information transmission on a same channel, even if a collision such as described above can be avoided. In the case where a certain terminal station does not want to perform communication with a terminal station, where a path loss with this terminal present at an extremely adjacent location is remarkably small compared to a path loss with other stations, transmission for collision avoidance will not be permitted, when receiving a signal of another terminal station (for example, refer to Patent Literature 1). That is, when a traffic amount increases on a channel, the interference amount to an adjacent terminal station will increase, and the band used by the adjacent terminal station will be limited.

SUMMARY OF INVENTION

Technical Problem

The inventors of the technology disclosed in the present disclosure have provided an excellent wireless communication apparatus and wireless communication method, which can suitably perform information transfer, by a system which controls access to a media in accordance with an occupancy state of the media.

The inventors of the technology disclosed in the present disclosure have provided an excellent wireless communication apparatus and wireless communication method, which can suitably perform information transfer, while suppressing interference to other terminal stations, and preventing a reduction of a transmission opportunity of other terminal stations.

Solution to Problem

The present application has been made in view of the aforementioned problems. According to a technology described in claim 1, there is provided a wireless communication apparatus including: a transmission unit which transmits a wireless signal; a reception unit which receives a wireless signal; a transmission power control unit which controls a transmission power of the transmission unit; and an interference suppression unit which instructs the transmission power control unit to change a transmission power so as to suppress interference in accordance with a distance from a surrounding terminal station.

According to a technology described in claim 2, the interference suppression unit of the wireless communication apparatus according to claim 1 may instruct the transmission power control unit to change a transmission power so as to suppress interference to a terminal station with a far distance.

According to a technology described in claim 3, the interference suppression unit of the wireless communication apparatus according to claim 1 may instruct the transmission power control unit to change a transmission power in accordance with a decision value weighted according to a distance from another communicable terminal station.

According to a technology described in claim 4, the interference suppression unit of the wireless communication apparatus according to claim 3 may perform an instruction so as to lower a transmission power in a case where it is estimated the number of terminal stations with a far distance has increased based on the decision value.

According to a technology described in claim 5, the interference suppression unit of the wireless communication apparatus according to claim 3 may perform an instruction so as to raise a transmission power in a case where it is estimated the number of terminal stations with a far distance has decreased based on the decision value.

According to a technology described in claim 6, the interference suppression unit of the wireless communication apparatus according to claim 1 may instruct the transmission power control unit to reduce a transmission power so as to suppress interference to a terminal station with a distance farther than a presently communicating terminal station.

According to a technology described in claim 7, the interference suppression unit of the wireless communication apparatus according to claim 1 may perform an instruction so as to reduce a transmission power in a case where a communicable terminal station is present, and a terminal station estimated to be most distant is not a target for performing communication.

According to a technology described in claim 8, the interference suppression unit of the wireless communication apparatus according to claim 7 may not perform an instruction to reduce a transmission power at a time when the number of communicable terminal stations is less than a prescribed number.

According to a technology described in claim 9, the interference suppression unit of the wireless communication apparatus according to claim 1 may decide whether or not a terminal station estimated to be most distant is a target for performing communication based on a belonging condition of a group in a mesh network, a communication history, or a specification of nexthop.

According to a technology described in claim 10, the interference suppression unit of the wireless communication apparatus according to claim 1 may instruct the transmission power control unit to change a transmission power so as to suppress interference with a hidden terminal.

According to a technology described in claim 11, the interference suppression unit of the wireless communication apparatus according to claim 1 may perform an instruction so as to reduce a transmission power of the transmission power control unit at a time when the total number of terminal stations having a influence on transmission and reception of a packet of itself is estimated, and the total number exceeds a prescribed value.

According to a technology described in claim 12, the interference suppression unit of the wireless communication apparatus according to claim 11 may estimate the total number of terminal stations having a influence on transmission and reception of a packet of itself based on a Beacon Interval Timing Element included in a beacon or action frame to be transmitted by each terminal station.

According to a technology described in claim 13, the interference suppression unit of the wireless communication apparatus according to claim 1 may cause information related to a transmission power to be transmitted to another terminal station.

According to a technology described in claim 14, the interference suppression unit of the wireless communication apparatus according to claim 13 may instruct the transmission power control unit to increase a transmission power at a time when transmitting information related to a transmission power to another terminal station.

According to a technology described in claim 15, the interference control unit of the wireless communication apparatus according to claim 13 may cause a packet in which information related to a transmission power is described to be transmitted by broadcast transfer or multicast communication.

According to a technology described in claim 16, the interference control unit of the wireless communication apparatus according to claim 13 may transmit a control request of a transmission power to another terminal station as information related to a transmission power.

According to a technology described in claim 17, the interference control unit of the wireless communication apparatus according to claim 13 may transmit information related to a transmission power of itself as information related to a transmission power.

According to a technology described in claim 18, the interference control unit of the wireless communication apparatus according to claim 13 may perform a control of a transmission power of itself in accordance with receiving information related to a transmission power from another terminal station.

According to a technology described in claim 19, the wireless communication apparatus according to claim 1 may further includes: a signal detection capability control unit which controls a signal detection capability of the reception unit. The interference suppression unit instructs the signal detection capability control unit to change a signal detection capability in accordance with a change of a transmission power.

According to a technology described in claim 20, there is provided a wireless communication method including: an estimation step which estimates interference corresponding to a distance from a surrounding station; and a transmission power control step which controls a transmission power at a time of data transmission so as to suppress the interference.

Advantageous Effects of Invention

According to the technology disclosed in the present disclosure, there is provided an excellent wireless communication apparatus and wireless communication method, which can suitably perform information transfer, while suppressing interference to other terminal stations, and preventing a reduction of a transmission opportunity of other terminal stations.

A wireless communication apparatus applying the technology disclosed in the present disclosure can autonomously operate as a terminal station, in a network where wireless access control is performed based on CSMA, for example, can suppress interference to other terminal stations by controlling a transmission power, and can cause a transmission opportunity of other terminal stations to not be wastefully reduced.

A wireless communication apparatus applying the technology disclosed in the present embodiment can cause a transmission opportunity to be improved, by suppressing interference to terminal stations with a far distance from itself.

In addition, the effects described in the present specification are merely illustrative and demonstrative, and not limitative. In other words, the technology according to the present disclosure can exhibit other effects that are evident to those skilled in the art along with or instead of the effects based on the present specification.

The object, features, and advantages of the present disclosure will be made clear later by a more detailed explanation that is based on the embodiments of the present disclosure and the appended drawings.

DESCRIPTION OF EMBODIMENTS

Hereinafter, embodiments of the technology disclosed in the present disclosure will be described in detail while referring to the figures.

The technology disclosed in the present disclosure can be applied to a wireless network to which an access system is applied based on CSMA, adopted by IEEE802.11 or the like. For example, the technology disclosed in the present disclosure can be applied to a mesh network such as prescribed by IEEE802.11s. In this type of wireless network, it is assumed that a plurality terminal stations are adjacently present which use a same channel.

Figure 2:
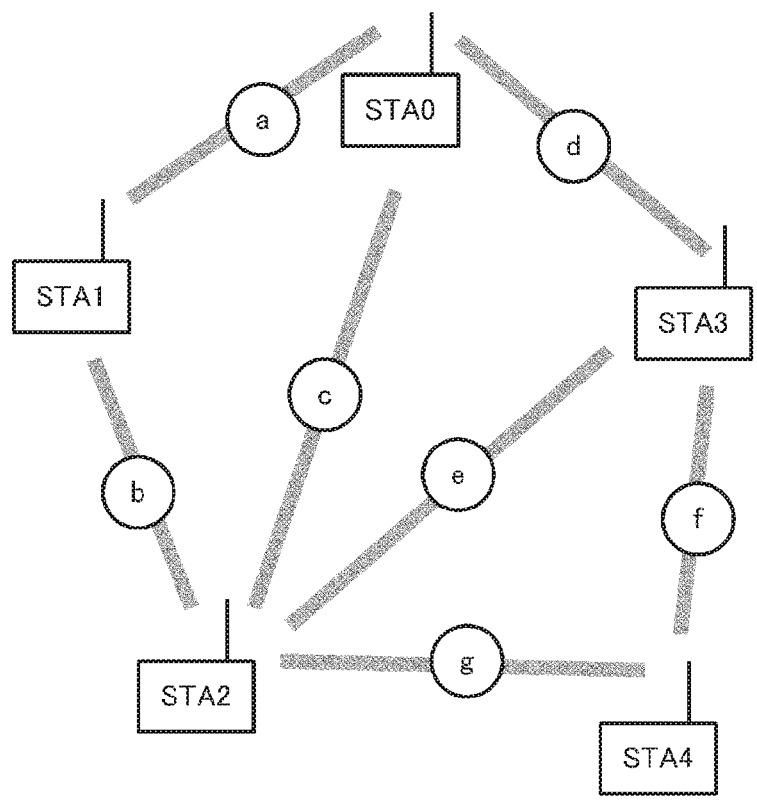
FIG. 2 is a figure which schematically shows a configuration example of an Ad-hoc network.

Ad-hoc communication, an Ad-hoc network or the like are known as communication methods which autonomously and mutually connect between adjacent terminal stations. FIG. 2 schematically shows a configuration of an Ad-hoc network. In such a network, it is possible for each of the terminal stations STA0 to STA4 to mutually perform direct communication with adjacent terminal stations, without depending on a master station such as an access point. Within the figure, terminal stations capable of direct communication are respectively connected by straight lines a to g. Each of the terminal stations STA0 to STA4 adopt a wireless access system based on CSMA. Further, in an Ad-hoc network, when a new terminal station appears adjacent, this terminal station can also be freely added to the network.

A scenario can also be considered in which each of the terminal stations are not only mutually connected with autonomous and adjacent terminal stations, but also transfer (relay) information exchanged with other terminal stations in a bucket brigade manner. For example, in FIG. 2, while the STA0 is only able to perform direct communication with the STA1 and the STA3, from a reason such as electric waves not reaching, by having the STA3 transfer (relay) data of the STA0, it becomes possible for the STA0 and the STA4 to mutually exchange information. A method in which such terminal stations mutually perform a bucket brigade, and deliver information to far terminal stations, is called a multi-hop relay. A network which performs multi-hop communication is generally known as a mesh network.

In FIG. 2, while only 5 terminal stations are drawn, it is assumed that a plurality of terminal stations which use a same channel are adjacently present, in a mesh network or the like.

In an access system based on CSMA, each terminal station confirms an occupancy state of a media before transmission of a packet, and performs transmission in the case where the media is clear. In order to avoid a collision of packets, in other words, in the case where a terminal station receives a packet not related to itself, a transmission opportunity of a packet is limited. In relation to this, there are the following problems (1) to (4), in a mesh network or the like of an access system based on CSMA.

Problem (1) Unnecessary Electric Wave Interference

By controlling a transmission power and a signal detection capability in accordance with the number of nodes in which terminal stations are adjacent, the number of communicable terminal stations can be limited (for example, refer to Patent Literature 1). However, in this method, since only the number of communicable terminal stations is considered as a trigger for controlling the transmission power and a signal detection capability, a control of the transmission power is not performed as long as it does not reach a prescribed number. For example, even in the case where many packets are detected for a terminal station not performing direct data communication, a transmission power control is not performed. Accordingly, there will be a problem such as a terminal station having a data transmission opportunity of itself limited by data communication not related to itself. Further, conversely, there will be a problem such as a terminal station limiting a transmission opportunity of other terminal stations not related to this communication, by communication of itself.

Problem (2) Reduction of a Transmission Opportunity by Hidden Terminals

In an access system based on CSMA, in order to avoid a collision of packets by hidden terminals, a transmission opportunity of hidden terminals is suppressed by RTS/CTS (described above). In a method which limits the number of communicable terminal stations, by controlling a transmission power and a signal detection capability in accordance with the number of nodes in which terminal stations are adjacent (for example, refer to Patent Literature 1), there is no particular consideration for hidden terminals. Accordingly, even in the case where the number of hidden terminals has increased, a terminal station does not particularly perform a control of the transmission power. However, since the possibility of interference will increase in the case where the number of hidden terminals has increased, from the viewpoint of the mechanism of RTS/CTS, there will be a problem such as having a transmission opportunity limited in order to avoid interference.

Problem (3) Electric Wave Interference by Non-Matching of Transmission Powers

When the transmission power is controlled for each terminal station, non-uniformity of access control is produced by non-matching of the transmission powers. In order to resolve this, a method can be considered in which a terminal station controls the signal detection capability in accordance with the transmission power (for example, refer to Patent Literature 1). However, electric wave interference will still occur by packets sent from other terminal stations, even if a signal detection capability is controlled. Accordingly, there will be a problem such a collision of data occurring, and the throughput not rising.

Problem (4) Difficulty for an Estimation of a Transmission Power of a Partner

Usually, path loss information is estimated based on a difference between a transmission power of a communication partner and a reception RSSI, and an appropriate Modulation and Coding Scheme (MCS) is determined based on the path loss information and a packet loss error (an MCS is an index number which shows a combination of a Phy rate, an encoding rate, and a modulation system used for packet transmission). However, the above described estimation method of a path loss will have a precondition of the transmission power of a terminal station which becomes a communication partner being fixed (or already known). As will be described below, in the case where each terminal station individually performs transmission power control with the intention of interference suppression or the like, the transmission power is not fixed. That is, since the transmission power of a communication partner is unknown, a path loss is not able to be estimated by measuring an RSSI. As a result of this, a terminal station is not able to select an appropriate MCS, and efficient use of a channel becomes difficult.

Accordingly, in the technology disclosed in the present disclosure, in a wireless network to which an access system is applied based on CSMA, at least a part of a terminal station suppresses interference to other terminal stations by controlling the transmission power, and causes a transmission opportunity of other terminal stations to not be wastefully reduced.

Figure 1:
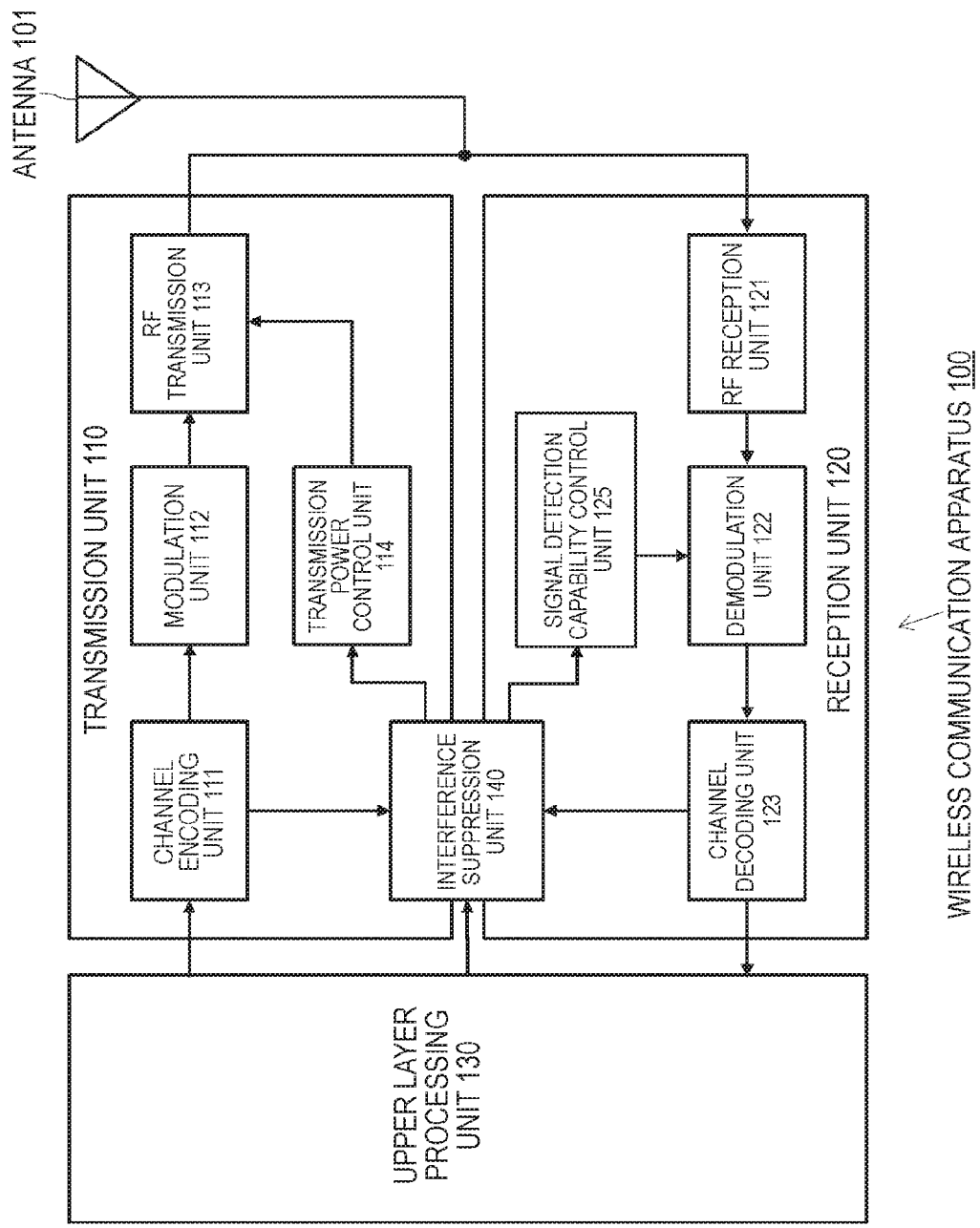
FIG. 1 is a figure which shows a configuration of a wireless communication apparatus 100 applying the technology disclosed in the present disclosure.

FIG. 1 shows a configuration of a wireless communication apparatus 100, applying the technology disclosed in the present disclosure, which can operate as a terminal station in a wireless network to which an access system is applied based on CSMA. The substance of the wireless communication apparatus 100, in addition to a wireless device, is one of various types of information devices in which a wireless LAN function is installed, such as a multifunctional information terminal such as a personal computer or a smartphone, a network printer, or a network drive.

The illustrated wireless communication apparatus 100 includes a transmission unit 110, a reception unit 120, a transmission and reception antenna 101 shared by the transmission unit 110 and the reception unit 120, an upper layer processing unit 130 which performs the processes of transmission data to be sent from the transmission unit 110 and reception data received by reception unit 120, and an interference removal unit 140.

The transmission unit 110 and the reception unit 120 mainly perform processes of a physical (Phy) layer. Further, the upper layer processing unit 130 performs processes of a media connection control (Media Access Control: MAC) based on CSMA, and processes corresponding to an upper layer more than that of a MAC layer.

The upper layer processing unit 130 performs access control to a network based on CSMA and data transmission and reception using RTS/CTS, management of transmission and reception of a beacon and a beacon transmission timing (TBTT: Target Beacon Transmission Time) of adjacent terminal stations or the like, as a MAC layer process. Further, the upper layer processing unit 130 starts a prescribed application, for example, in accordance with a request of a user or the like. The application generates transmission data to be transmitted to a terminal station which becomes a communication partner, and performs a process of reception data which can be sent from the communication partner.

The transmission unit 110 includes a channel encoding unit 111, a modulation unit 112, an RF transmission unit 113, and a transmission power control unit 114.

The channel encoding unit 111 encodes the transmission data handed over from the upper layer processing unit 130, and additionally performs error correction encoding. The modulation unit 112 applies a modulation process such as OFDM to the error correction encoded transmission data. Also, the RF transmission unit 113 converts a digital signal after being modulated into an analogue signal, additionally performs an RF transmission process such as up-conversion or power amplification to an RF band, and afterwards performs sending from the antenna 101. The transmission power control unit 114 outputs an instruction value of power amplification to the RF transmission unit 113, in accordance with an instruction from the interference suppression unit 140, such as will be described below, and controls the transmission power.

The reception unit 120 includes an RF reception unit 121, a demodulation unit 122, a channel decoding unit 123, and a signal detection capability control unit 125.

The RF reception unit 121 performs an RF reception process such as low noise amplification, down-conversion, or conversion to a digital signal, of a signal received by the antenna 101. The demodulation unit 122 applies a demodulation process such as OFDM to a received digital signal. Also, the channel decoding unit 123 decodes reception data after being demodulated, and hands it over to the upper layer processing unit 130, by additionally performing error correction.

The signal detection capability control unit 125 changes a signal detection capability in the demodulation unit 122 within the reception unit 120, for example, in accordance with an instruction from the interference suppression unit 140. Here, signal detection generally detects the presence of signal with a preamble portion of a received packet, and is attached to a position as a part of a synchronization process. Therefore, the signal detection capability control unit 125 can control the signal detection capability by changing a threshold set for preamble detection. Alternatively, in the case where a switch and attenuator are inserted into a signal reception system and the signal detection capability is wanted to be lowered, a means can be taken for adopting a reception signal as a reception signal via an attenuator. Alternatively, a means can be taken for adjusting a bit width of AD conversion. In the case where the signal detection capability is lowered, a large quantitative error is allowed by performing AD conversion with a small bit width, and an SNR of a received signal is caused to be equivalently reduced.

The interference suppression unit 140 suppresses interference to other terminal stations, and arbitrary outputs a change instruction of the transmission power to the transmission power control unit 114, so as to cause a transmission opportunity of other terminal stations to not be reduced, or to suppress a reduction of a transmission opportunity of itself. The interference suppression unit 140 performs the following (1) to (3), for example, as processes which suppresses interference to other terminal stations. When collected together, it can be said that the interference suppression unit 140 controls the transmission power so as to suppress interference in accordance with the distance from surrounding terminal stations. However, the details of each of the processes (1) to (3) will be made in the below description.

(1) Interference suppression to terminal stations with a low reception RSSI (in other words, with a far distance)

(2) Interference suppression to terminal stations with a distance farther than communicating terminal stations (3) Suppression of a reduction of a transmission opportunity by hidden terminals In order to perform an interference suppression process such as described above, the interference suppression unit 140 estimates interference given to surrounding terminal stations and interference received by itself, by monitoring a packet transmission and reception process performed by the upper layer processing unit 130, and analyzing a characteristic amount extracted from transmission data input to the channel encoding unit 111 and reception data after being decoded by the channel decoding unit 123. It is possible for the interference suppression unit 140 to be arranged within one of the transmission unit 110, the reception unit 120, and the upper layer processing unit 130, or to be arranged independent from these.

Further, the interference suppression unit 140 can instruct the signal detection capability control unit 125 to change the signal detection capability in the demodulation unit 122, so that a transmittable range from the transmission unit 110 and a receivable range in the reception unit 120 are balanced, in accordance with a change of the transmission power. Further, the interference suppression unit 140 performs management of the transmission power with other terminal stations (sharing of transmission power information, transmission power control of other terminal stations or the like).

Embodiment 1

Here, an embodiment will be described in which the wireless communication apparatus 100, which operates as a terminal station in a network of a wireless access system based on CSMA, suppresses interference to terminal stations with a low reception RSSI (with a far distance). As will be described hereinafter, a terminal station suppresses interferences to a terminal station with a far distance, by controlling the transmission power of itself, in accordance with a value weighted according to a distance from other communicable terminal stations.

In a network which performs multi-hop communication, such as IEEE802.11s, it is possible to transmit a packet by a bucket brigade. In such a case, it is possible to perform more efficient and stable data transmission, for a terminal station with an electric wave condition that is not favorable by a reason such as being at a far distance, by transmitting via a terminal station on the way (a relay station) than by transmitting a direct packet.

Figure 3:
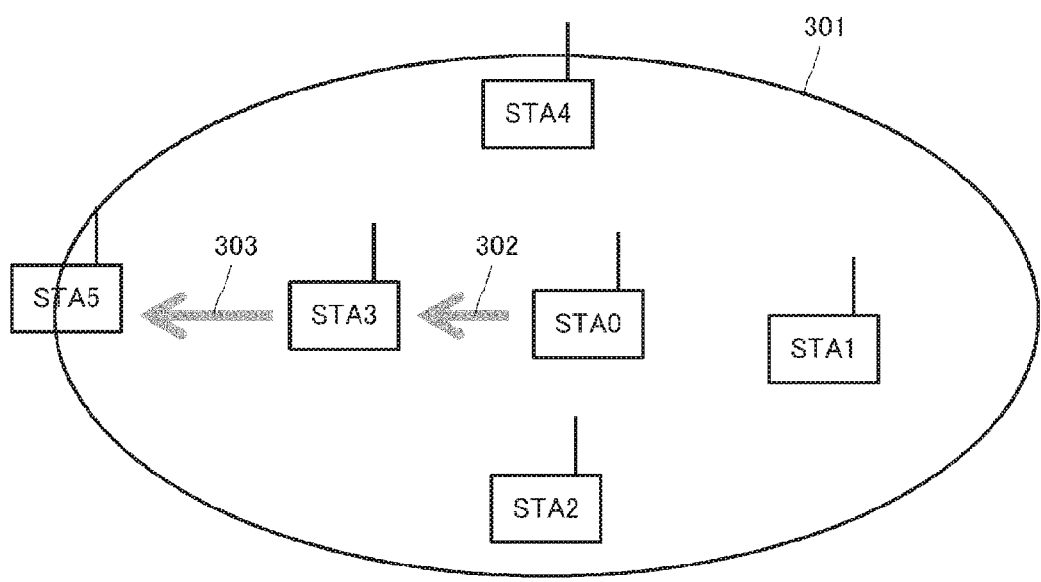
FIG. 3 is a figure which schematically shows a configuration example of a network which performs multi-hop communication.

For example, multi-hop communication will be considered, in a network configuration such as shown in FIG. 3. In the same figure, 6 terminal stations STA0 to STA5 are operating. From among these, the arrival range of a packet to be sent from the STA0 is enclosed by the oval shown by reference numeral 301.

The STA5 is present in the vicinity of the boundary of the packet arrival range 301 of the STA0. Accordingly, a transmission packet from the STA0 reaches or does not reach at the STA5. That is, since the electric wave state is not stable at the time when communicating from the STA0 to the STA5, paths 302 and 303 are formed, in a multi-hop network, so as to communicate from the STA0 to the STA5 via the STA3.

That is, in the example shown in FIG. 3, the STA0 and the STA5 do not perform direct communication. However, in the case where the STA5 is able to receive a packet sent by the STA0, the STA5 has transmission limited in order to avoid a collision.

Further, in the case where the STA5 is within an arrival capable range 301 of a packet of transmission of the STA0, even in the case where the STA0 and the STA5 do not belong to a same communication group to begin with (if IEEE802.11s, in the case where the STA0 and the STA5 respectively belong to groups having a different mesh id), a transmission opportunity of the STA5 is suppressed, in order to avoid electric wave interference, similar to that described above.

Accordingly, in the present embodiment, at the time when the wireless communication apparatus 100 is operated as the STA0, for example, interference to terminal stations with a far distance such as the STA5 is suppressed, by controlling the transmission power of itself, in accordance with a value weighted according to a distance between the other communicable terminal stations STA1 to STA5.

Specifically, the interference suppression unit 140 estimates a distance to other terminal stations (within a receivable range), from an MCS or RSSI, for example, and instructs the transmission power control unit 114 to control the transmission power, in accordance with a decision value weighted with respect to distance. For example, in the case where it is estimated that the number of terminal stations with a far distance has increased, from a decision value weighted with respect to distance, the transmission power of itself is lowered. As a result of this, transmission by multi-hop is explicitly performed, and it is possible to suppress electric wave interference of a multi-hop destination.

Here, an example of a value weighted with respect to distance is a sum value of a coefficient α being multiplied by a value $1/R_k$ representing a distance on the basis of an RSSI value $R_k$ of each terminal station k (however k is set to a serial number), such as shown in the following Equation (1). The interference suppression unit 140 uses this sum value for a decision value which determines a control of the transmission power.

[Math. 1]

$$\sum_k \left( \frac{1}{R_k} \times \alpha \right) \quad (1)$$

In the case where the decision value exceeds a prescribed threshold β, it is estimated that the number of terminal stations with a far distance has increased, and so an electric wave interference of a multi-hop destination is suppressed, by lowering the transmission power of itself, such as shown in the following Equation (2). On the other hand, in the case where the decision value falls below a prescribed threshold γ, it is estimated that the number of terminal stations with a far distance has decreased, and so the margin for surely performing data transmission is secured, by raising the transmission power of itself, such as shown in the following Equation (3).

[Math. 2]
$$\beta < \sum_k \left( \frac{1}{R_k} \times \alpha \right) \Rightarrow \text{Reduction of transmission power} \quad (2)$$

[Math. 3]
$$\gamma > \sum_k \left( \frac{1}{R_k} \times \alpha \right) \Rightarrow \text{Increase of transmission power} \quad (3)$$

Note that, the threshold β for a reduction of the transmission power and the threshold γ for an increase of the transmission power may be set to different values (β≠γ) (for example, γ<β), so that the transmission power does not frequently change in accordance with a change of the decision value shown in the above Equation (1).

Figure 10:
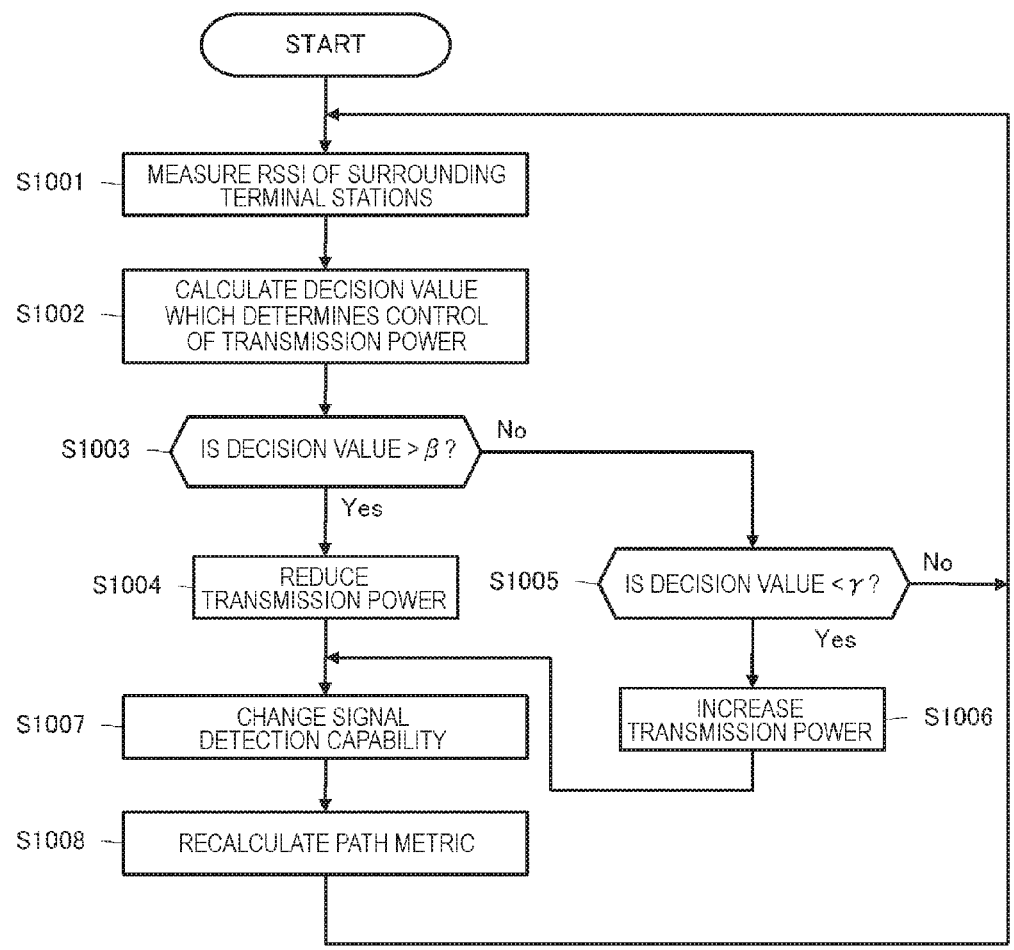
FIG. 10 is a flow chart which shows a process procedure for the wireless communication apparatus 100 to control a transmission power of itself based on distance information of other terminal stations.

FIG. 10 shows a process procedure, in the form of a flow chart, for the wireless communication apparatus 100, which operates as a terminal station within a multi-hop network, to control the transmission power of itself based on distance information of other terminal stations.

First, in the reception unit 120, RSSI of reception packets from surrounding terminal stations are measured (step S1001).

The interference suppression unit 140 calculates a decision value which determines a control of the transmission power, in accordance with the above Equation (1), by acquiring the RSSI of each terminal station measured by the reception unit 120 (step S1002).

The interference suppression unit 140 compares the calculated decision value with the threshold β for reducing the transmission power (step S1003). Here, in the case where the decision value exceeds the threshold β for a reduction of the transmission power (Yes in step S1003), such as shown in the above Equation (2), the interference suppression unit 140 outputs an instruction to the transmission power control unit 114 so as to reduce the transmission power (step S1004). The transmission power control unit 114 controls power amplification in the RF transmission unit 113, by replying to this instruction. Note that, the calculated transmission power is used for all of the transmission packets including a beacon.

On the other hand, in the case where the decision value is at or below the threshold β for a reduction of the transmission power (No in step S1003), to continue, the interference suppression unit 140 compares the calculated decision value with the threshold γ for increasing the transmission power (step S1005). Then, at the time when the decision value falls below the threshold γ for an increase of the transmission power (Yes in step S1005), such as shown in the above Equation (3), the interference suppression unit 140 outputs an instruction of power amplification for the RF transmission unit 113 to the transmission power control unit 114, so as to increase the transmission power (step S1006). By controlling the transmission power of itself, interference to terminal stations with a far distance can be suppressed. Note that, the calculated transmission power is used for all of the transmission packets including a beacon.

Further, at the time when the transmission power is changed in step S1004 or step S1006, in combination with this, the interference suppression unit 140 performs an instruction to the signal detection capability control unit 125 so as to change the signal detection capability in the demodulation unit 122 within the reception unit 120 (step S1007). For example, at the time when the transmission power is caused to be reduced, the transmittable range is reduced, and so an adjustment is performed so as not to detect a packet received with a small power, in accordance with this. However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S1008). However, it will be arbitrary whether or not a recalculation of the path metric is also performed, along with a change of the transmission power.

Note that, in the process which reduces the transmission power in the above described step S1004, for example, the wireless communication apparatus 100 may cause a reduction up until a minimum transmission power, which is a necessary minimum limit at which the present data transfer is able to be retained. The minimum transmission power stated here can be calculated based on a data transfer speed necessary for presently transferred data, path loss information obtained from an RSSI or MCS, and a QoS of data. Further, in the case where the transmission power is lowered up until the minimum transmission power in step S1004, there may be an operation which returns to the transmission power prior to lowering, in the process which increases the transmission power in step S1006.

In the above description, while an RSSI value is used as a value having a correlation with the distance of terminal stations, the substance of the technology disclosed in the present disclosure is not limited to such a calculation method of a decision value. For example, a distance up until the surrounding terminal stations may be estimated, by using a wireless module other than IEEE802.11s. Further, a distance up until each of the terminal stations may be calculated from a captured image of a camera (for example, a stereoscopic camera) or the like.

A supplemental remark will be described for a control of the signal detection capability of the reception unit 120, performed in step S1007.

When each of the terminal stations individually perform transmission power control such as described above, a condition will occur in which the transmission power is different according to the terminal stations. In such a case, there is a high possibility that the terminal station with the largest transmission power will obtain a transmission opportunity, and there is a concern that a transmission opportunity will become non-uniform for each of the terminal stations.

Figure 13:
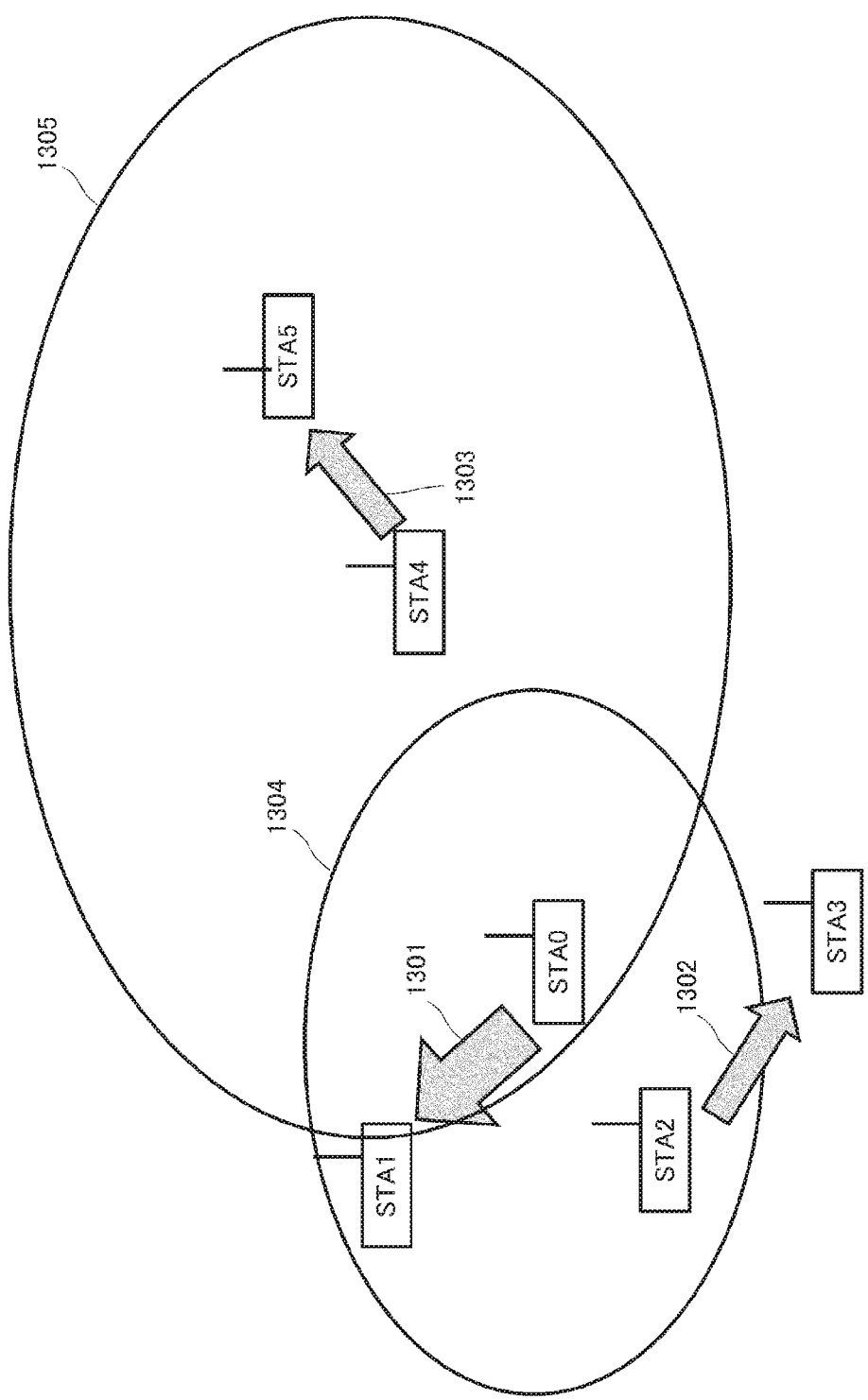
FIG. 13 is a figure which illustrates a wireless network environment in which a transmittable range becomes non-uniform for each terminal station.

FIG. 13 illustrates a wireless network environment in which a transmittable range becomes non-uniform for each of the terminal stations. In the illustrated example, 6 terminal stations from STA0 up to STA5 are present. Also, data transmission from the STA0 to the STA1 is performed, in the direction shown by arrow 1301, data transmission from the STA2 to the STA5 is performed, in the direction shown by arrow 1302, and data transmission from the STA4 to the STA5 is performed, in the direction shown by arrow 1303. Note that, here, it is assumed to be the case where each terminal station is connected by peer-to-peer and performs transfer, such as Wi-Fi Direct or a mesh network.

The STA0 lowers the transmission power. The transmittable range of the STA0 becomes small, such as represented by the oval shown by reference numeral 1304. On the other hand, the STA4 keeps a large transmission power. The transmittable range of the STA4 is represented by the oval shown by reference numeral 1305, and includes the STA0. When wireless access is performed based on CSMA in such a condition, the STA0 can detect a signal sent from the STA4, and so can stop a transmission of data, for example, when receiving an RTS packet of the STA4. On the other hand, the STA4 is not able to detect a signal of the STA0, and so is capable of performing data transmission of itself, for example, without detecting an RTS packet of the STA0.

Since such a non-uniformity of the transmission opportunity reduces, the STA0 performs a control together with the signal detection capability of itself, at the time when changing the transmission power. That is, in the STA0, a threshold of signal detection changes in the demodulation unit 122 within the reception unit 120. The STA0 narrows the signal detection range, by raising a threshold of signal detection in the demodulation unit 122, at the time when reducing the transmission power of itself.

Figure 14:
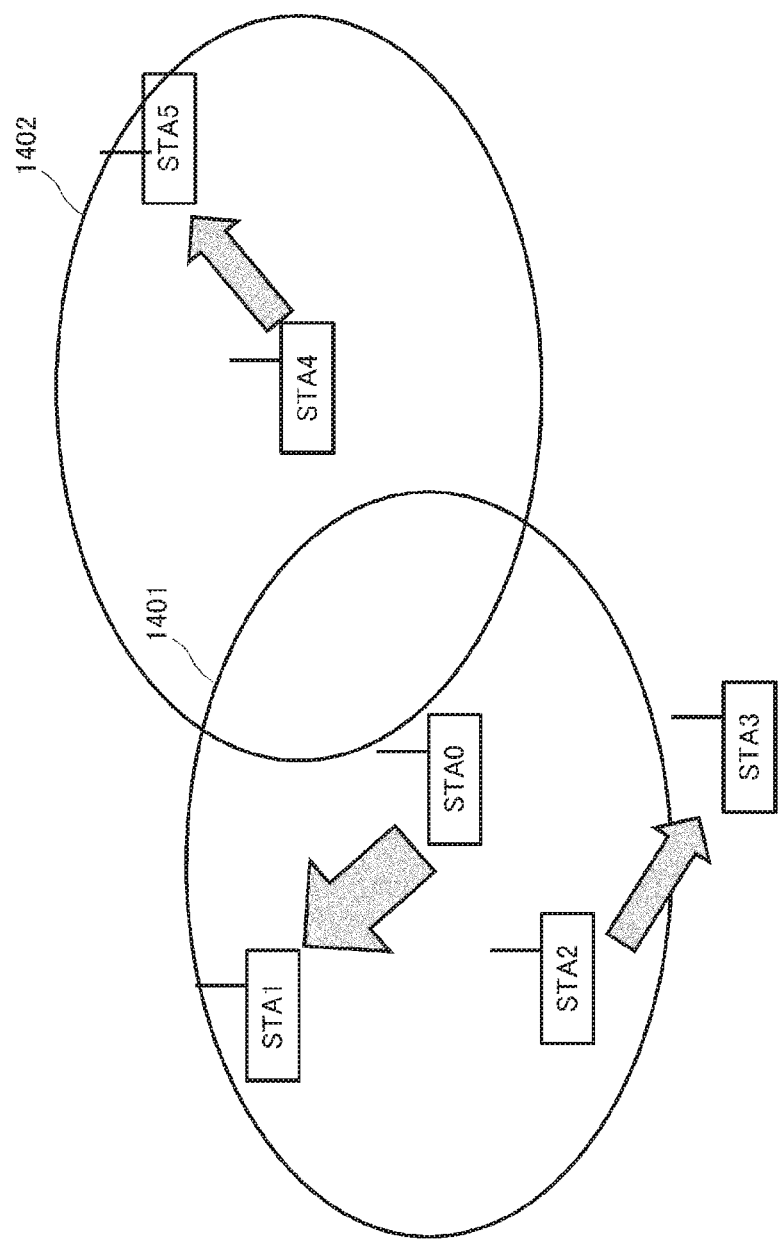
FIG. 14 is a figure which shows a virtual transmittable range of another terminal station for a terminal station which has a threshold of signal detection raised.

FIG. 14 shows a virtual transmittable range of the STA4 for the STA0, at the time when the STA0 raises a threshold of signal detection. As illustrated, at the time when the STA0 reduces a transmittable range 1401 of itself, an effect similar to narrowing the transmittable range of the STA4 such as shown by reference numeral 1402 can be obtained, by additionally narrowing the signal detection range. Since the STA0 is not able to detect a signal of the STA4, it becomes possible to perform data transmission of itself, for example, without detecting an RTS packet of the STA4.

Further, a supplemental remark will be described for a recalculation of the path metric, performed in step S1008.

In order to select a path, in a wireless mesh network including IEEE802.11s, a value which shows the closeness of the path, that is, a path metric, is calculated. In IEEE802.11s, the time which a channel is occupied at the time when transmitting a data frame, calculated from a transfer speed of a physical layer, a packet error rate or the like, is prescribed as a default path metric.

In a wireless network, it is assumed that the condition of the propagation environment and each of the terminal stations changes moment by moment. Accordingly, a calculation of the path metric is performed at fixed time intervals. However, when a terminal station changes the transmission power or the signal detection capability in step S1008, there will be a high possibility that discrepancies in the actual value are produced with the calculated path metric, and defects occur such as a packet loss of the transmission data. Therefore, in the case where changing the transmission power or the signal detection capability of itself, it is preferable for a terminal station to perform a recalculation of the path metric.

A recalculation of the path metric is executed by having a terminal station of a transmission source transmit a path request PREQ packet, similar to at the time of a usual path signal. However, at the time when a terminal station, which is a relay node and not a transmission source of data, changes the transmission power, a path metric is not able to be obtained by a method which transmits a PREQ. Accordingly, a terminal station, which is a relay node, transmits a path error PERR packet to a terminal station of a transmission source. PERR is originally used in the case where a mesh path set for a deterioration of a wireless link or the like is not able to be used, and prompts a refresh of the mesh path (a recalculation of the path metric) to a transmission source. Therefore, the path metric is recalculated according to this operation.

According to the first embodiment, by causing the transmission power of itself to be reduced, a terminal station can suppress interference to terminal stations distantly separated which do not perform direct communication, and can prevent a reduction of a transmission opportunity of other terminal stations.

Embodiment 2

Here, an embodiment will be described in which the wireless communication apparatus 100, which operates as a terminal station in a network of a wireless access system based on CSMA, suppresses interference to terminal stations with a distance farther than presently communicating terminal stations. As will be described below, a terminal station suppresses interference to terminal stations with a distance farther than presently communicating terminal stations, by lowering the transmission power of itself to the extent that a communication link with presently communicating terminal stations is not reduced.

For example, in an Ad-hoc network, there will be a problem such as a terminal station having a transmission opportunity of itself limited for data communication not related to itself. Further, conversely, there will be a problem such as limiting a transmission opportunity of other non-related terminal stations, in order for communication of itself.

Figure 4:
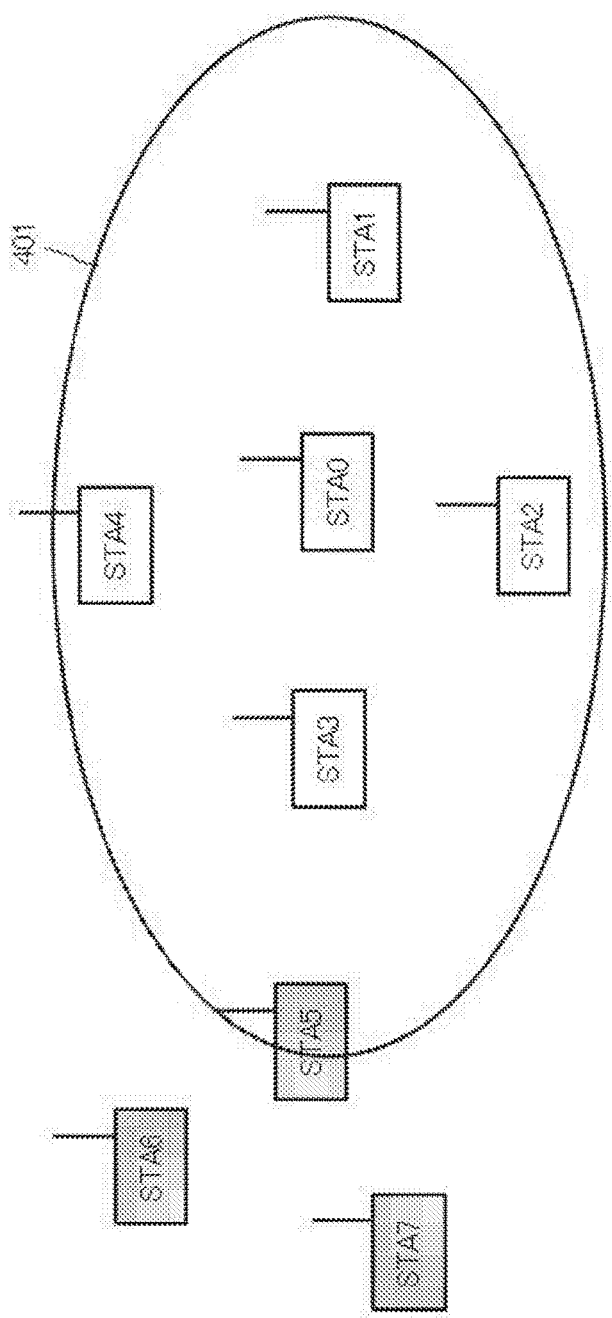
FIG. 4 is a figure which schematically shows a configuration example of a mesh network in which different groups exist together.

Mutual interference between terminal stations will be considered, as an example, in a configuration of a mesh network in which different groups exist together such as shown in FIG. 4. In the same figure, while 8 terminal stations STA0 to STA7 are operating, the 5 of the STA0, the STA1, the STA2, the STA3, and the STA4 belong to a group A, and the 3 of the STA5, the STA6, and the STA7 displayed in gray belong to a group B. Further, the arrival range of a packet to be sent from the STA0 belonging to the group A is enclosed by the oval shown by reference numeral 401.

Since the STA0 belongs to a network different to that of the STA5, data is not mutually exchanged. However, since the STA5 is within the arrival range of a packet of the STA0, it receives interference.

Accordingly, in the present embodiment, at the time when the wireless communication apparatus 100 operates as the STA0, for example, in the case where there are already sufficient communicable terminal stations, and in the case where a terminal station estimated to be most distant is not a target for performing communication, by suppressing unnecessary electric wave interference, by reducing the arrival range of a packet by lowering the transmission power, a reduction of a transmission opportunity of terminals not a target for performing communication can be prevented.

Figure 5:
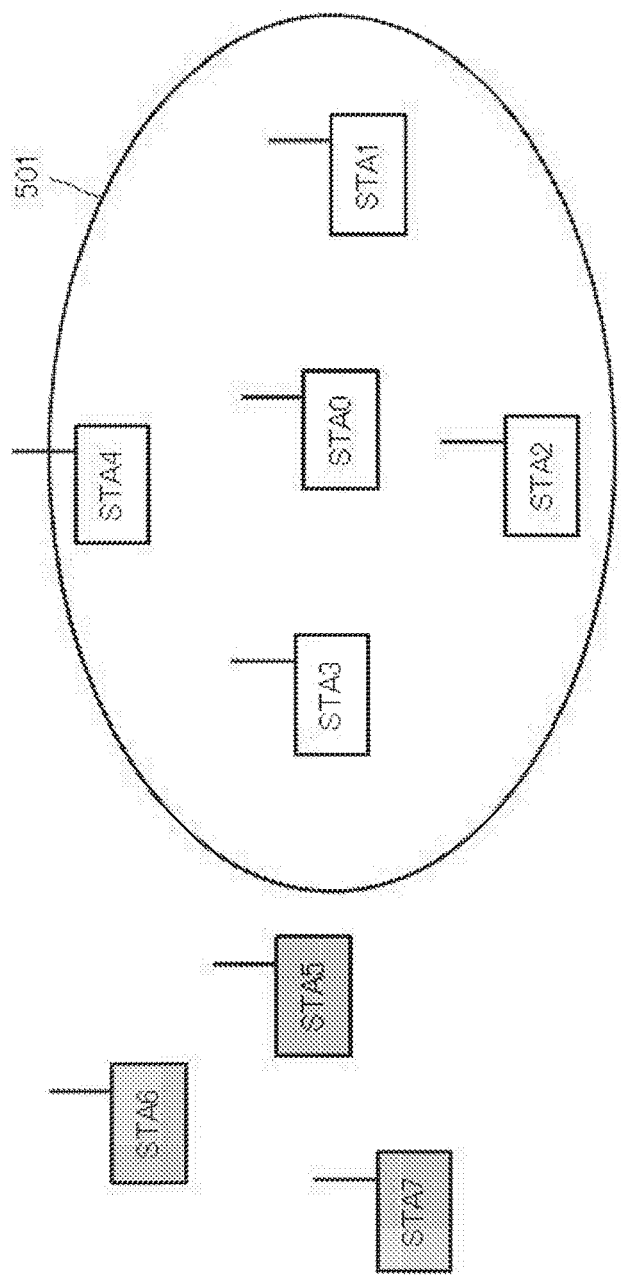
FIG. 5 is a figure which shows a state in which the STA0 within FIG. 4 causes an arrival range of a packet to be reduced by lowering a transmission power.

FIG. 5 shows a state in which the STA0 within FIG. 4 causes an arrival range of a packet to be reduced by lowering the transmission power. Within the figure, the arrival range of a transmission packet of the STA0 after being reduced is enclosed by the oval shown by reference numeral 501. In this way, at the time when it is detected that the STA5, which is most distant from itself, is a terminal station not related to communication, the STA0 suppresses interference, and prevents a reduction of a transmission opportunity of the STA5 which is not a target for performing communication, by lowering the transmission power of itself.

Figure 11:
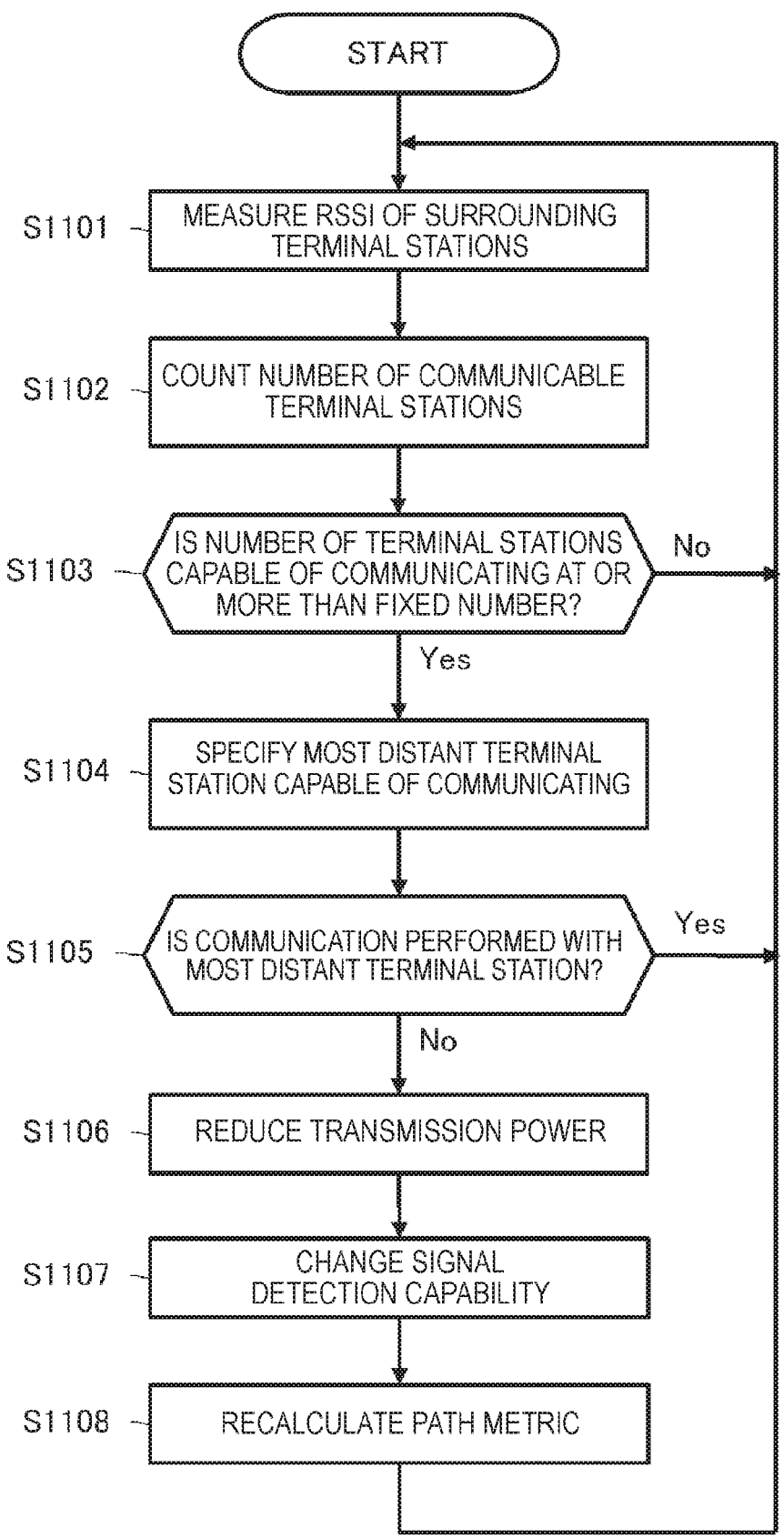
FIG. 11 is a flow chart which shows a process procedure for the wireless communication apparatus 100 to control a transmission power of itself so as to suppress interference to terminal stations with a far distance not performing communication.

FIG. 11 shows a process procedure, in the form of a flow chart, for the wireless communication apparatus 100, which operates as a terminal station on a network of a wireless access system based on CSMA, to control the transmission power of itself so as to suppress interference to terminal stations with a far distance not performing communication.

First, in the reception unit 120, RSSI of reception packets from surrounding terminal stations are measured (step S1101).

Next, the interference suppression unit 140 checks whether or not communication with the transmission sources of each reception packet is possible, based on information of the RSSI measured in step S1101, and counts the number of terminal stations capable of communicating (step S1102). Then, the interference suppression unit 140 checks whether or not the terminal stations presently capable of communicating are present at or more than a fixed number (step S1103).

Here, in the case where the number of communicable terminal stations is less than a fixed number (No in step S1103), subsequent control of the transmission power is avoided. This is because, when the transmission power is lowered under such a condition, the number of communicable terminal stations is additionally reduced, and a communication opportunity of itself is remarkably impaired.

On the other hand, in the case where the terminal stations presently capable of communicating are present at or more than a fixed number (Yes in step S1103), to continue, the interference suppression unit 140 specifies the one with a furthest distance from among the terminal stations capable of communicating (step S1104).

In addition to using an RSSI value as a value having a correlation with the distance, a method which estimates a distance by using a wireless module other than IEEE802.11s, a method which performs a calculation from a captured image of a camera or the like can be included as a method which estimates distance information with each of the terminal stations capable of communicating (described above).

Then, the interference suppression unit 140 checks whether or not communication is performed with the terminal station decided to be most distant (step S1105). The interference suppression unit 140 can decide whether or not communication is performed with the terminal station, based on belonging information of a group such as described above.

In the case where communication is performed with a terminal station which is most distant (Yes in step S1105), subsequent control of the transmission power is avoided. This is because, when the transmission power is lowered under such a condition, communication with this terminal station is interrupted.

On the other hand, in the case where communication is not performed with the terminal station which is most distant (No in step S1105), the interference suppression unit 140 outputs an instruction to the transmission power control unit 114 so as to reduce the transmission power (step S1106). The transmission power control unit 114 controls power amplification in the RF transmission unit 113, by replying to this instruction. By lowering the transmission power of itself, interference can be suppressed, and a reduction of a transmission opportunity of terminal stations which are not a target for performing communication can be prevented. Note that, the calculated transmission power is used for all of the transmission packets including a beacon.

Further, at the time when the transmission power is changed in step S1106, in combination with this, the interference suppression unit 140 performs an instruction to the signal detection capability control unit 125 so as to change the signal detection capability in the demodulation unit 122 within the reception unit 120 (step S1107). For example, at the time when the transmission power is caused to be reduced, the transmittable range is reduced, and so an adjustment is performed so as not to detect a packet received with a small power, in accordance with this. However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S1108). However, it will be arbitrary whether or not a recalculation of the path metric is also performed, along with a change of the transmission power.

Note that, in step S1105, it may be decided whether or not communication with a terminal station is performed, based on information other than the belonging condition of a group. For example, while performing direct communication is also possible, it can be decided that a terminal station not communicating so much from a communication history is not performing communication. Further, if a network of IEEE802.111s, it may be decided that a terminal not specified in nexthop is not performing communication.

According to the second embodiment, by causing the transmission power of itself to be reduced, a terminal station can suppress interference to terminal stations distantly separated which do not perform direct communication, and can prevent a reduction of a transmission opportunity of other terminal stations.

Embodiment 3

Here, an embodiment will be described in which the wireless communication apparatus 100, which operates as a terminal station in a network of a wireless access system based on CSMA, suppresses interference with hidden terminals. As will be described hereinafter, a terminal station suppresses interference with hidden terminals, and suppresses a reduction of a transmission opportunity, by controlling the transmission power of itself in accordance with the number of terminal stations detected by itself, and the number of terminal stations detected by other adjacent terminal stations.

Figure 6:
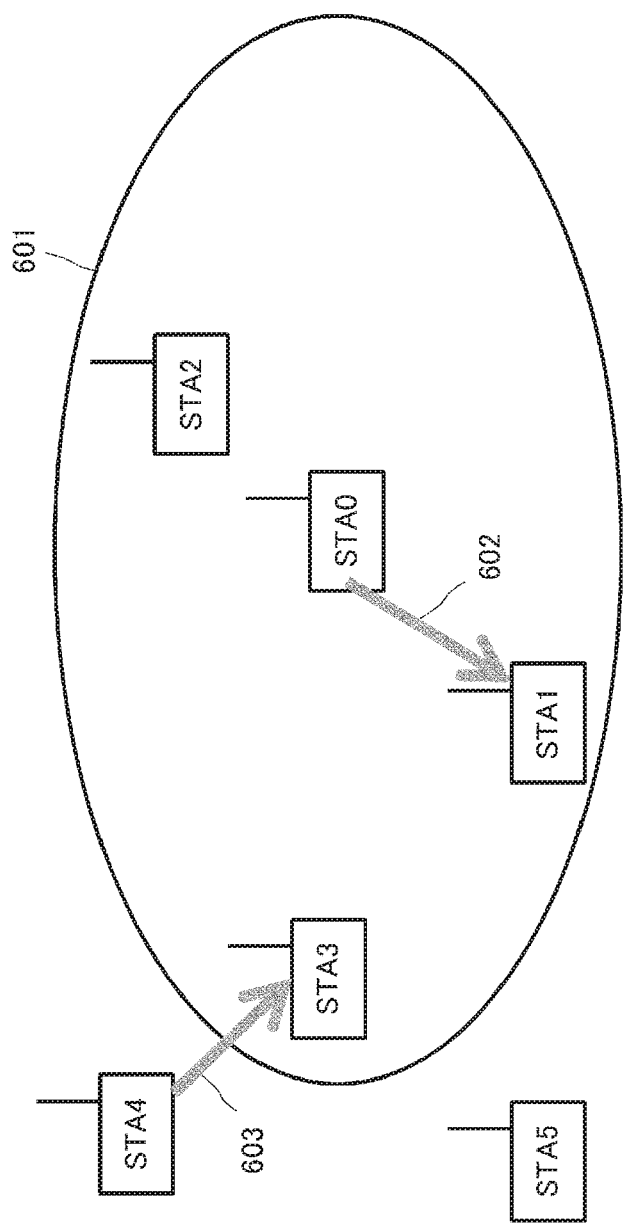
FIG. 6 is a figure which schematically shows a configuration example of a network in which a hidden terminal is present.

For example, mutual interference between terminal stations will be considered, in a configuration of a network in which hidden terminals are present such as shown in FIG. 6. In the same figure, 6 terminal stations STA0 to STA5 are operating, and from among these, the arrival range of a packet to be sent from the STA0 is enclosed by the oval shown by reference numeral 601. A state is shown in which the STA1, the STA2, and the STA3 can receive, and the STA4 and the STA5 are not able to receive, a packet transmitted from the STA0.

In this case, since the STA4 does not know the state of the STA0, at the time when the STA0 transmits data to the STA1 such as shown by reference numeral 602, there is the possibility that data is transmitted to the STA3 such as shown by reference numeral 603, during the same time period as the sending timing of the STA0. In this case, a packet of the STA0 and a packet of the STA4 will collide, and the STA3 will not be able to receive data of the STA4.

In order to resolve such a hidden terminal problem, in a network which performs access control based on CSMA, an RTS/CTS system is jointly used (described above). However, when using RTS/CTS, while a collision of packets can be suppressed, the sending timing is delayed. When there are many surrounding terminal stations or hidden terminals, the throughput does not rise, as a result of the sending timing being delayed.

Accordingly, in the present embodiment, at the time when the wireless communication apparatus 100 operates as the STA0, for example, the presence of hidden terminals is estimated, and the transmission power is controlled in accordance with the number of terminal stations having a substantial influence on the transmission and reception of a packet of itself, which includes hidden terminals.

The substance of the technology disclosed in the present disclosure is not particularly limited to a method which estimates the number of hidden terminals. For example, if a network of IEEE802.11s, it can be considered to use a Beacon Interval Timing Element, used for preventing a collision of beacons informed by each of the terminal stations.

Figure 7:
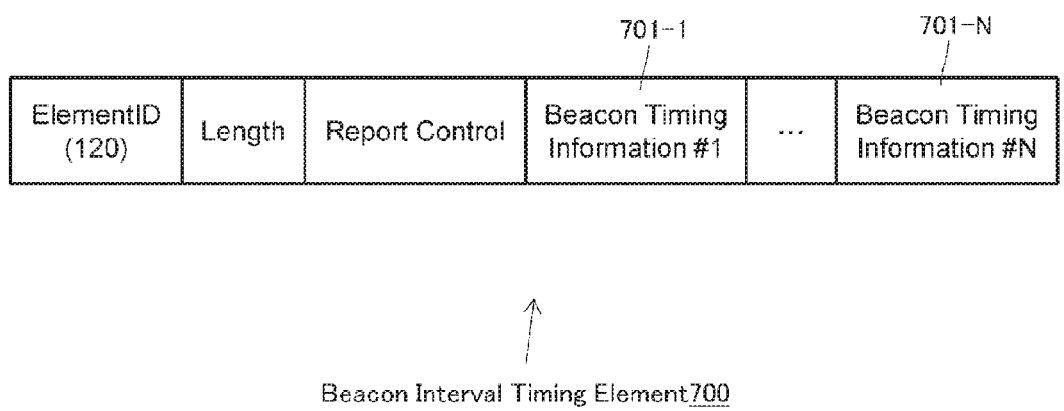
FIG. 7 is a figure which shows a data format of a Bescon Interval Timing Element.

FIG. 7 shows a data format of a Bescon Interval Timing Element. Usually, a Beacon Interval Timing Element is inserted into a beacon or action frame and transmitted. Transmission timing information of beacons of other terminal stations received by each of the terminal stations is stored in the Beacon Interval Timing Element. A Beacon Interval Timing Element 700 shown in FIG. 7 has stored beacon timing information 701-1, . . . , 701-N of N received parts. Usually, a terminal station receiving a Beacon Interval Timing Element determines a beacon transmission timing of itself, so that a collision does not occur based on a transmission timing of a reported beacon. By using a Beacon Interval Timing Element, it becomes possible for a collision of beacons to not occur, even between terminal stations (hidden terminals), for example, which are not able to receive a direct beacon. In the present embodiment, the number of hidden terminals is estimated, by using this mechanism.

Figure 8:
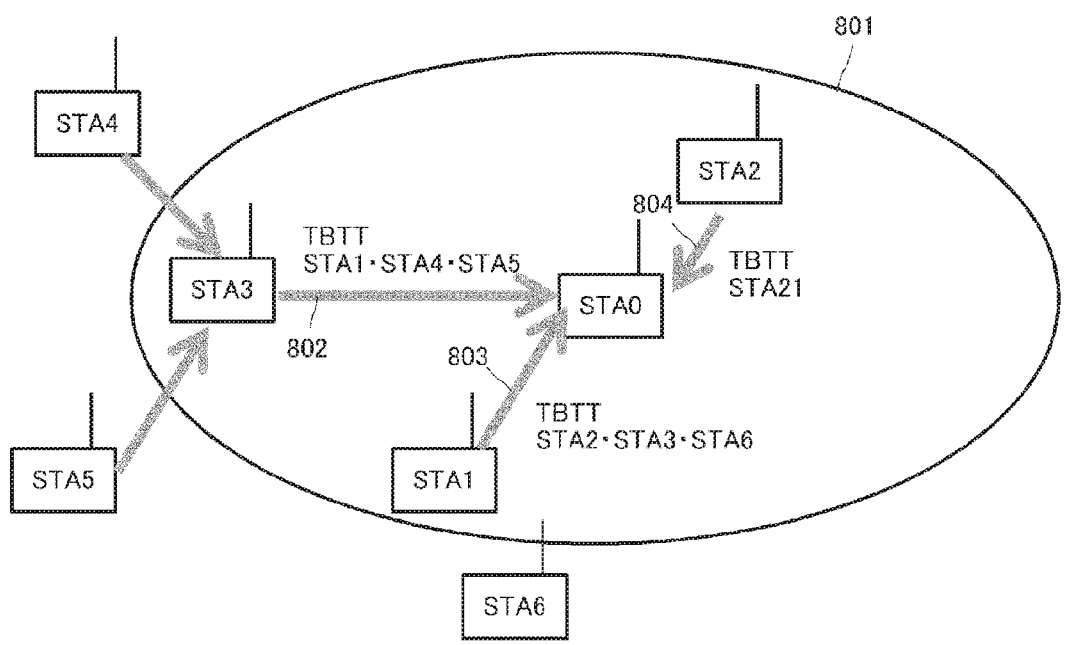
FIG. 8 is a figure for describing a method which estimates the number of hidden terminals by using a Beacon Interval Timing Element.

A description will be made, with reference to FIG. 8, for a method which estimates the number of hidden terminals by using a Beacon Interval Timing Element. In the same figure, 7 terminal stations STA0 to STA6 are operating. Further, the reception range of a packet to be sent from the STA0 is enclosed by the oval shown by reference numeral 801. In the illustrated network configuration, a list of terminal stations (reception side) in the reception range of a packet of each of the terminal stations (transmission side) is shown in the following Table 1.

TABLE 1

| Transmission Side | Reception Side |
|---|---|
| STA1 | STA0, STA2, STA3, STA6 |
| STA2 | STA0, STA1 |
| STA3 | STA0, STA1, STA4, STA5 |
| STA4 | STA3, STA5 |
| STA5 | STA3, STA5 |
| STA6 | STA1 |

The STA0 is only able to receive a beacon from the STA1, the STA2, and the STA3 within the reception range of itself (refer to reference numerals 802 to 804), and is not able to directly receive a beacon from the STA4, the STA5, and the STA6. On the other hand, since the STA3 can receive a beacon from the STA1, the STA4, and the STA5, a beacon is sent, by storing a beacon transmission timing (TBTT) of the STA1, the STA4, and the STA5 in a Beacon Interval Timing Element, such as shown by the reference numeral 801.

Therefore, the STA0 can estimate that the STA4 and the STA5, which are hidden terminals, are present, by viewing a difference between the Beacon Interval Timing Element included in a beacon received from the STA3, and a beacon transmission timing of the STA1, the STA2, and the STA3 managed by itself.

Further, since the STA1 can also receive a beacon of the STA6, which is a hidden terminal of the STA0, a beacon is sent, by storing a beacon transmission timing of the STA2, the STA3, and the STA6 in a Beacon Interval Timing Element, such as shown by the reference numeral 803. Also, the STA0 can estimate that the STA6 is present, based on the Beacon Interval Timing Element received from the STA1.

In this way, the STA0 can comprehend that there are the 3 of the STA1, the STA2, and the STA3 as terminal stations which can receive a direct beacon, and the 3 of the STA4, the STA5, and the STA6 as hidden terminals hidden terminals, present as terminal station having an influence on the transmission and reception of a packet of itself. Also, in the case where the number of terminal stations having a substantial influence, which includes hidden terminals, has exceeded a prescribed threshold, the STA0 controls the transmission power. In this way, it becomes possible for the STA0 to control the transmission power and the signal detection capability, in accordance with the presence of not only the terminal stations STA1, STA2, and STA3 to which direct electric waves reach, but also the terminal stations (hidden terminals) STA4, STA5, and STA6 to which direct electric waves do not reach but have a substantial influence.

Figure 12:
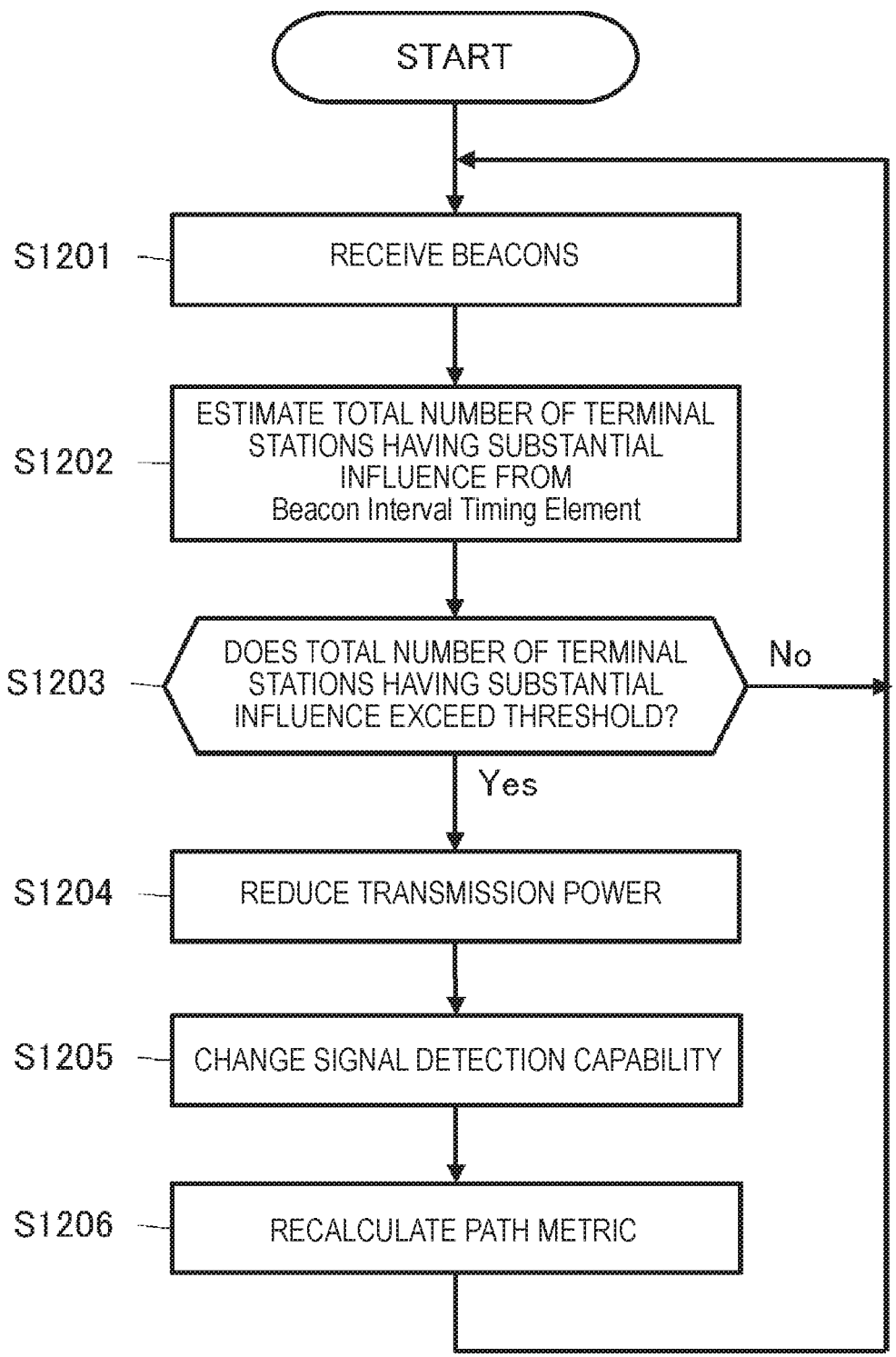
FIG. 12 is a flow chart which shows a process procedure for the wireless communication apparatus 100 to control a transmission power of itself in accordance with the presence of terminal stations having a substantial influence.

FIG. 12 shows a process procedure, in the form of a flow chart, for the wireless communication apparatus 100, which operates as a terminal station on a network of a wireless access system based on CSMA, to control the transmission power of itself in accordance with the presence of terminal stations having a substantial influence.

When beacons are received from surrounding terminal stations (step S1201), demodulation and decoding processes are performed by the reception unit 120. Then, the described contents of the beacons are analyzed by the upper layer processing unit 130.

The interference suppression unit 140 estimates the total number of terminal stations having a substantial influence on the transmission and reception of a packet of itself, which includes hidden terminals, from a Beacon Interval Timing Element stored in each of the received beacons (step S1202). Then, the total number of terminal stations having a substantial influence on the transmission and reception of a packet of itself, is compared with a prescribed threshold (step S1203).

If the total number of terminal stations having a substantial influence on the transmission and reception of a packet of itself is at or below the threshold (No in step S1203), subsequent control of the transmission power is not performed. This is because, when the transmission power is lowered under such a condition, the margin of the transmission power to terminal stations not performing direct communication becomes smaller, and communication becomes unstable.

On the other hand, in the case where the total number of terminal stations having a substantial influence on the transmission and reception of a packet of itself exceeds the threshold (Yes in step S1203), the interference suppression unit 140 outputs an instruction to the transmission power control unit 114 so as to reduce the transmission power (step S1204). The transmission power control unit 114 controls power amplification in the RF transmission unit 113, by replying to this instruction. By lowering the transmission power of itself, interference with terminals having a substantial influence such as hidden terminals can be suppressed. Note that, the calculated transmission power is used for all of the transmission packets including a beacon.

Further, at the time when the transmission power is changed in step S1204, in combination with this, the interference suppression unit 140 performs an instruction to the signal detection capability control unit 125 so as to change the signal detection capability in the demodulation unit 122 within the reception unit 120 (step S1205). For example, at the time when the transmission power is caused to be reduced, the transmittable range is reduced, and so an adjustment is performed so as not to detect a packet received with a small power, in accordance with this. However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S1206). However, it will be arbitrary whether or not a recalculation of the path metric is also performed, along with a change of the transmission power.

Note that, while a method has been described in detail above in which hidden terminals are estimated by using an existing frame format (prescribed by IEEE802.11) such as a beacon or an action frame which includes a Beacon Interval Timing Element, the hidden terminals can be estimated by a method other than this.

Various information elements (Information Element: IE) can be stored in a frame body of a beacon frame. A Vendor Specific IE is defined as one of these. A Vendor Specific IE is an information element capable of being freely added and used by a vendor. In the present embodiment, by storing and mutually using information of terminal stations (which can receive a beacon) detected by itself in a Vendor Specific IE, information of hidden terminals can be acquired. Further, information of hidden terminals may be broadcast, multicast, or unicast as a data packet of an IP layer.

According to the third embodiment, at the time when the number of hidden terminals has increased, a terminal station can suppress interference by reducing the transmission power of itself, and can prevent a reduction of a transmission opportunity of other terminal stations.

Embodiment 4

In the first through to third embodiments, a terminal station controls the transmission power of itself so as to suppress interference in accordance with a distance from surrounding terminal stations.

When such a transmission power is controlled for each terminal station, non-uniformity of access control is produced by non-matching of transmission powers. In order to resolve this, while a method has been considered in which a terminal station controls the signal detection capability in accordance with the transmission power, electric wave interference will still occur by packets sent from other terminal stations. Accordingly, there will be the above described problem (3) such as a collision of data occurring, and the throughput not rising.

Figure 9:
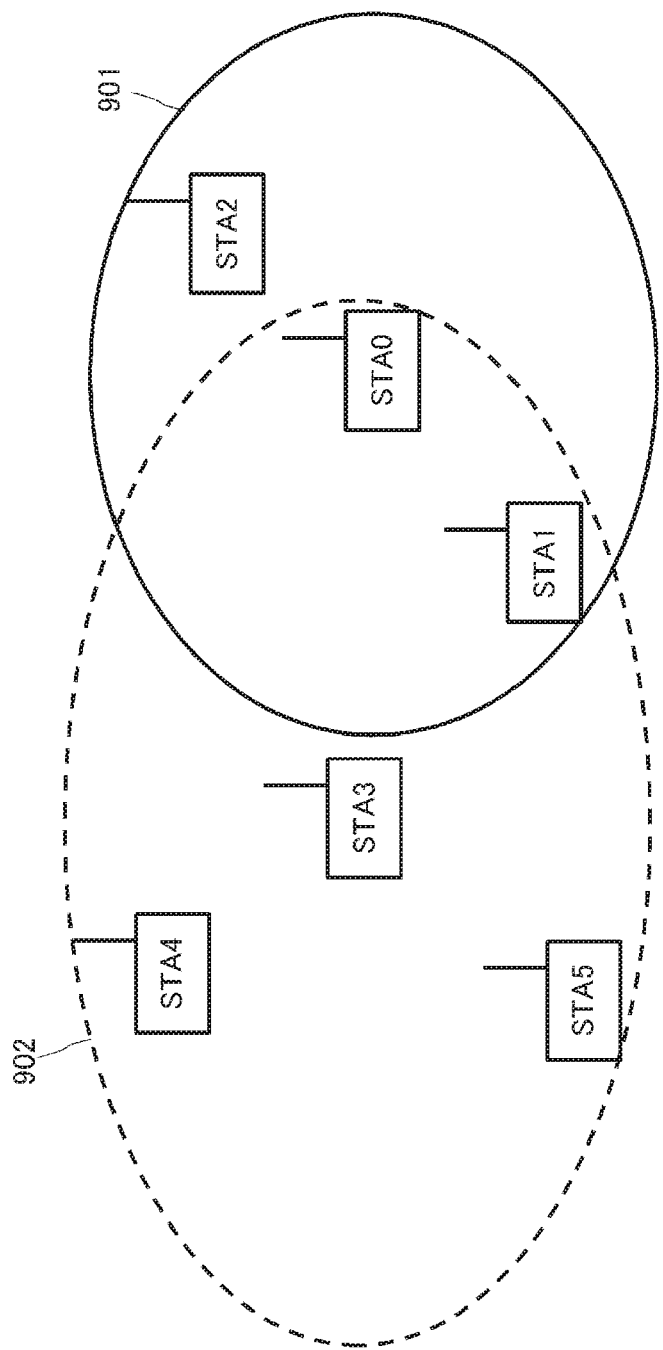
FIG. 9 is a figure which shows a configuration example of a network having a bias for a transmission power for each terminal station.

For example, a network having a bias for a transmission power for each terminal station, such as shown in FIG. 9, will be considered as an example. In the same figure, 6 terminal stations STA0 to STA5 are operating. From among these, the arrival range of a packet to be sent from the STA0 is enclosed by the solid line oval shown by reference numeral 901. Further, the arrival range of a packet to be sent from the STA3 is enclosed by the dotted line oval shown by reference numeral 902.

Here, the STA0 does not have a packet of the STA3 arrive, by controlling the signal detection capability at the same time as controlling the transmission power. In this way, the fairness of a data sending timing between the STA0 and the STA3 is maintained. However, since a packet of the STA3 arrives at the STA0 in an electric wave manner, such as can be understood from the STA0 being accommodated within the oval 902 within FIG. 9, there is the possibility that the packets of the STA0 and the STA3 will collide.

Accordingly, in the present embodiment, in order to resolve the non-matching of transmission powers between terminal stations, a method is introduced in which a terminal station notifies information related to the transmission power to surrounding terminal stations, and electric wave interference is suppressed.

For example, a control request of the transmission power is notified to surrounding terminal stations, as an example of information related to the transmission power. Peculiar information of a terminal station to be controlled (for example, an address or the like), and information such as an instruction value which instructs to what extent transmission information is to be controlled, are described in this control request. A terminal station to which interference is received suppresses interference of a packet, by sending a packet which requests a reduction of the transmission power to a terminal station which has become the cause of this. When described by applying to FIG. 9, by sending a packet which requests a reduction of the transmission power from the STA0 to the STA3, it is possible to cause the transmission power of the STA3 to be reduced, and to suppress interference of the packet. For example, in the case where the wireless communication apparatus 100 operates as the STA0, the interference suppression unit 140 or the upper layer processing unit 130 causes a packet which requests a reduction of the transmission power to be transmitted, in accordance with detecting interference of the packet.

Further, information of the transmission power of itself may be notified to surrounding terminal stations, as another example of information related to the transmission power. A terminal station to which interference is received broadcasts a packet, in which information of the transmission power of itself is described, to surrounding terminal stations. Alternatively, it may be transmitted to a terminal station address which has become a cause of interference. It is decided whether or not to control the transmission power, at the surrounding terminal station side receiving this packet. For example, the transmission power of itself may be controlled, so as to match information of the transmission power of a partner. Or, the transmission power may be controlled, by comparing an RSSI of a terminal station able to be received by a transmission source of this packet, and an RSSI of this partner observed by itself. It is needless to say that the surrounding terminal stations may ignore information of the transmission power received from a partner.

A terminal station can transmit information related to the transmission power such as described above by using an existing frame format. For example, a Vendor Specific IE defined as an information element capable of being freely added and used by a vendor, included in an existing frame format such as a beacon, can be used. Further, a terminal station may transmit information related to the transmission power, by defining an independent action frame such as a data packet of an IP layer, without using an existing frame format.

However, in the example shown in FIG. 9, the STA0 is in a state where the transmission power is caused to be reduced first, and electric waves to be sent from the STA0 do not reach up until the STA3. The STA0 is not able to perform a notification, even if a packet, in which information related to the transmission power is described, is directly transmitted to the STA3. Accordingly, the STA0 in a state where the transmission power is caused to be reduced first may cause the transmission power to be temporarily increased, at the time when performing transmission of a packet which notifies information related to the transmission power. In the wireless communication apparatus 100, which operates as the STA0, the interference suppression unit 140 may instruct the transmission power control unit 114 to transmit a transmission power corresponding to the type of packet, or the type of information included in the packet.

Alternatively, a terminal station in a state where the transmission power is caused to be reduced first may perform a notification by broadcast transferring a packet, in which information related to the transmission power is described. Or, a data frame, in which information related to the transmission power is described, may be notified by multi-hop communication.

According to the fourth embodiment, by mutually notifying information of the transmission power and information of surrounding terminal stations, between surrounding terminal stations, each of the terminal stations can set a more suitable transmission power. As a result, interference can be suppressed in the entire system, and a reduction of a transmission opportunity of other terminal stations can be prevented.

Further, in addition to causing the transmission power of surrounding terminal stations to be reduced in accordance with itself, information of the transmission power being able to be shared between terminal stations can be included, as an advantage for a terminal station to notify information related to the transmission power of itself to surrounding terminal stations. That is, the above described problem (4) can be resolved, and each of the terminal stations can estimate path loss information based on a difference between the transmission power of a communication partner and a reception RSSI, and as a result of this, efficient use of a channel becomes possible, by selecting an appropriate MCS.

CITATION LIST

Patent Literature

Patent Literature 1: JP 2005-253047A

INDUSTRIAL APPLICABILITY

So far, the embodiment of the present disclosure has been described in detail with reference to a specific embodiment.

However, it should be noted that various variations and alternative embodiments will become apparent to those skilled in the art without departing from the scope of the present disclosure.

While a description has been made in the present disclosure which centers on embodiments applied to a wireless network in which each terminal station performs autonomous distribution, such as an Ad-hoc network or a mesh network, the technology disclosed in the present disclosure is not limited to this. The technology disclosed in the present disclosure can be applied to various types of wireless networks, in which access to a media is controlled in accordance with an occupancy state of the media starting CSMA by each terminal station, and can suppress useless interference between terminal stations, and improve a transmission opportunity of each terminal station.

In short, the present technology has been disclosed in a form of illustration and should not be interpreted limitedly. To determine the gist of the present disclosure, patent claims should be taken into account.

Additionally, the present technology may also be configured as below.

(1)

A wireless communication apparatus including:
a transmission unit which transmits a wireless signal;
a reception unit which receives a wireless signal;
a transmission power control unit which controls a transmission power of the transmission unit; and
an interference suppression unit which instructs the transmission power control unit to change a transmission power so as to suppress interference in accordance with a distance from a surrounding terminal station.

(2)

The wireless communication apparatus according to (1), wherein the interference suppression unit instructs the transmission power control unit to change a transmission power so as to suppress interference to a terminal station with a far distance.

(3)

The wireless communication apparatus according to (1), wherein the interference suppression unit instructs the transmission power control unit to change a transmission power in accordance with a decision value weighted according to a distance from another communicable terminal station.

(4)

The wireless communication apparatus according to (3), wherein the interference suppression unit performs an instruction so as to lower a transmission power in a case where it is estimated the number of terminal stations with a far distance has increased based on the decision value.

(5)

The wireless communication apparatus according to (3), wherein the interference suppression unit performs an instruction so as to raise a transmission power in a case where it is estimated the number of terminal stations with a far distance has decreased based on the decision value.

(6)

The wireless communication apparatus according to (1), wherein the interference suppression unit instructs the transmission power control unit to reduce a transmission power so as to suppress interference to a terminal station with a distance farther than a presently communicating terminal station.

(7)
The wireless communication apparatus according to (1), wherein the interference suppression unit performs an instruction so as to reduce a transmission power in a case where a communicable terminal station is present, and a terminal station estimated to be most distant is not a target for performing communication.

(8)
The wireless communication apparatus according to (7), wherein the interference suppression unit does not perform an instruction to reduce a transmission power at a time when the number of communicable terminal stations is less than a prescribed number.

(9)
The wireless communication apparatus according to (7), wherein the interference suppression unit decides whether or not a terminal station estimated to be most distant is a target for performing communication based on a belonging condition of a group in a mesh network, a communication history, or a specification of nexthop.

(10)
The wireless communication apparatus according to (1), wherein the interference suppression unit instructs the transmission power control unit to change a transmission power so as to suppress interference with a hidden terminal.

(11)
The wireless communication apparatus according to (1), wherein the interference suppression unit performs an instruction so as to reduce a transmission power of the transmission power control unit at a time when the total number of terminal stations having a influence on transmission and reception of a packet of itself is estimated, and the total number exceeds a prescribed value.

(12)
The wireless communication apparatus according to (11), wherein the interference suppression unit estimates the total number of terminal stations having a influence on transmission and reception of a packet of itself based on a Beacon Interval Timing Element included in a beacon or action frame to be transmitted by each terminal station.

(13)
The wireless communication apparatus according to (1), wherein the interference suppression unit causes information related to a transmission power to be transmitted to another terminal station.

(13-1)
The wireless communication apparatus according to (13), wherein information related to a transmission power is transmitted by using a Vendor Specific IE of an existing frame format.

(13-2)
The wireless communication apparatus according to (13), wherein information related to a transmission power is transmitted by using an independently defined action frame.

(14)
The wireless communication apparatus according to (14), wherein the interference suppression unit instructs the transmission power control unit to increase a transmission power at a time when transmitting information related to a transmission power to another terminal station.

(15)
The wireless communication apparatus according to (13), wherein the interference control unit causes a packet in which information related to a transmission power is described to be transmitted by broadcast transfer or multicast communication.

(16)
The wireless communication apparatus according to (13), wherein the interference control unit transmits a control request of a transmission power to another terminal station as information related to a transmission power.

(17)
The wireless communication apparatus according to (13), wherein the interference control unit transmits information related to a transmission power of itself as information related to a transmission power.

(18)
The wireless communication apparatus according to (13), wherein the interference control unit performs a control of a transmission power of itself in accordance with receiving information related to a transmission power from another terminal station.

(19)
The wireless communication apparatus according to (1), further including:
a signal detection capability control unit which controls a signal detection capability of the reception unit,
wherein the interference suppression unit instructs the signal detection capability control unit to change a signal detection capability in accordance with a change of a transmission power.

(20)
A wireless communication method including:
an estimation step which estimates interference corresponding to a distance from a surrounding station; and
a transmission power control step which controls a transmission power at a time of data transmission so as to suppress the interference.

REFERENCE SIGNS LIST 100 wireless communication apparatus
101 antenna
110 transmission unit
111 channel encoding unit
112 modulation unit
113 RF transmission unit
114 transmission power control unit
120 reception unit
121 RF reception unit
122 demodulation unit
123 channel decoding unit
125 signal detection capability control unit
130 upper layer processing unit
140 interference suppression unit

The invention claimed is:
1. A wireless communication apparatus, comprising:
a transmission unit configured to transmit a first wireless signal;
a reception unit configured to receive a second wireless signal; and
an interference suppression unit configured to:
reduce a first transmission power of the transmission unit to suppress interference based on:
a communicable terminal station of a first plurality of terminal stations that is present within a receivable range of the wireless communication apparatus; and
a first terminal station of a second plurality of terminal stations that is most distant among the second plurality of terminal stations and is an unintended target for communication, wherein the first terminal station is within the receivable range of the wireless communication apparatus; and generate an instruction to modify a signal detection capability of the reception unit based on the reduction in the first transmission power of the transmission unit.

2. The wireless communication apparatus according to claim 1, wherein the interference suppression unit is further configured to reduce the first transmission power to suppress interference caused by the wireless communication apparatus to the first terminal station.

3. The wireless communication apparatus according to claim 1, wherein the interference suppression unit is further configured to:

calculate a decision value based on a first distance from a second terminal station of the second plurality of terminal stations that is within the receivable range; and reduce the first transmission power based on the calculated decision value.

4. The wireless communication apparatus according to claim 3, wherein the interference suppression unit is further configured to reduce the first transmission power based on an increase in a number of third terminal stations of the second plurality of terminal stations with a second distance greater than a threshold, wherein the number of third terminal stations determined based on the decision value.

5. The wireless communication apparatus according to claim 3, wherein the interference suppression unit is further configured to raise the first transmission power based on a number of third terminal stations with a second distance lower than a threshold, wherein the number of third terminal stations is determined based on the decision value.

6. The wireless communication apparatus according to claim 1, wherein the interference suppression unit is further configured to reduce the first transmission power to suppress interference to a second terminal station of the second plurality of terminal stations that is farther than a communicating terminal station among the first plurality of terminal stations.

7. The wireless communication apparatus according to claim 1, wherein the interference suppression unit is further configured to maintain the first transmission power unchanged based on a count of the first plurality of terminal stations that is less than a determined number.

8. The wireless communication apparatus according to claim 1, wherein the interference suppression unit is further configured to determine whether the first terminal station that is most distant, is the unintended target for the communication based on a belonging condition of a group in a mesh network, a communication history, or a specification of nexthop.

9. The wireless communication apparatus according to claim 1, wherein the interference suppression unit is further configured to reduce the first transmission power to suppress interference with a hidden terminal.

10. The wireless communication apparatus according to claim 1, wherein the interference suppression unit is further configured to:

determine a total number of second terminal stations that have an influence on transmission and reception of a packet of the wireless communication apparatus; and reduce the first transmission power of the transmission unit based on the total number that exceeds a determined value.

11. The wireless communication apparatus according to claim 10, wherein the interference suppression unit is further configured to determine the total number of the second terminal stations based on a Beacon Interval Timing Element included in a beacon or action frame to be transmitted by each of the second terminal stations.

12. The wireless communication apparatus according to claim 1, wherein the interference suppression unit is further configured to transmit information related to the first transmission power of the transmission unit to a second terminal station.

13. The wireless communication apparatus according to claim 12, wherein the interference suppression unit is further configured to increase the first transmission power of the transmission unit based on the information related to the first transmission power that is transmitted to the second terminal station.

14. The wireless communication apparatus according to claim 12, wherein the interference control unit is further configured to transmit a packet that comprises the information related to the first transmission power by broadcast transfer or multicast communication.

15. The wireless communication apparatus according to claim 12, wherein the interference control unit is further configured to transmit a control request of the first transmission power to the second terminal station as the information related to the first transmission power.

16. The wireless communication apparatus according to claim 1, further comprising an interference control unit configured to transmit first information related to second transmission power of the wireless communication apparatus to a second terminal station.

17. The wireless communication apparatus according to claim 16, wherein the interference control unit is further configured to control the second transmission power of the wireless communication apparatus based on second information related to a third transmission power of the second terminal station that is received from the second terminal station.

18. The wireless communication apparatus according to claim 1, further comprising a signal detection capability control unit configured to control the signal detection capability of the reception unit based on the instruction generated by the interference suppression unit.

19. A wireless communication method, comprising:

in a wireless communication apparatus that comprises a transmission unit and a reception unit:

determining interference based on a distance from a first terminal station of a first plurality of terminal stations that is within a receivable range of the wireless communication apparatus;

reducing a transmission power of the transmission unit to suppress the interference based on:

a communicable terminal station of a second plurality of terminal stations that is present within the receivable range of the wireless communication apparatus; and the first terminal station that is most distant among the first plurality of terminal stations and is an unintended target for communication; and modifying a signal detection capability of the reception unit based on the reduction in the transmission power of the transmission unit.

* * * * *